United States Patent

Koike et al.

[11] Patent Number: 5,817,746
[45] Date of Patent: Oct. 6, 1998

[54] POLYMERIZATION OF HEXAFLUOROPROPENE OXIDE

[75] Inventors: Noriyuki Koike; Takashi Matsuda; Shinichi Sato; Hirofumi Kishita; Masatoshi Arai, all of Usui-gun, Japan

[73] Assignee: Shin-Etsu Chemical Co., Ltd., Tokyo, Japan

[21] Appl. No.: 940,965

[22] Filed: Sep. 30, 1997

[30] Foreign Application Priority Data

Oct. 2, 1996 [JP] Japan .................................. 8-281339

[51] Int. Cl.⁶ .......................... C08G 65/22; C08G 59/68
[52] U.S. Cl. .......................... 528/402; 528/408; 528/421
[58] Field of Search .................... 528/402, 408, 528/421

[56] References Cited

U.S. PATENT DOCUMENTS

| | | | |
|---|---|---|---|
| 3,322,826 | 5/1967 | Moore | 260/544 |
| 3,660,315 | 5/1972 | Hill et al. | 260/2 |
| 4,303,593 | 12/1981 | Kuhne | 562/851 |

FOREIGN PATENT DOCUMENTS

| | | |
|---|---|---|
| 2026686 | 1/1971 | Germany . |
| 2147157 | 3/1972 | Germany . |
| 53-5360 | 2/1978 | Japan . |

OTHER PUBLICATIONS

Chemical Abstracts, vol. 81, No. 6, 12 Aug. 1974, 26333.
Hill, J. T., "Polymers from Hexafluoropylene", J. Marcromol. Sci. Chem., vol. 8, No. 3 (1974) pp. 499–520.
European Search Report.
CA AN:117:251917, Feng et al., Controlled synthesis of . . . poly(hexafluoropropylene oxide), Sep. 1992.
CA, AN:95:204487, Duan et al., "Anionic polymerization of hexafluoropropylene oxide", Feb. 1981.

*Primary Examiner*—Randy Gulakowski
*Attorney, Agent, or Firm*—Millen, White, Zelano & Branigan, P.C.

[57] ABSTRACT

In polymerizing hexafluoropropene oxide (HFPO) into a fluorinated polyether, a liquefied gas of fluorocarbon having 1 to 4 carbon atoms is added to a reactor. HFPO is polymerized in the reactor while maintaining a gas phase in the reactor under a pressure lower than the vapor pressure of the liquefied gas and allowing the liquefied gas to evaporate from the polymerization system. Heat of polymerization can be efficiently removed from the HFPO polymerization system of high viscosity, and the polymerization temperature is kept low.

5 Claims, No Drawings

POLYMERIZATION OF HEXAFLUOROPROPENE OXIDE

BACKGROUND OF THE INVENTION

1. Field of the Invention

This invention relates to a method for polymerizing hexafluoropropene oxide (to be abbreviated as HFPO, hereinafter) and more particularly, to a method for polymerizing HFPO while efficiently removing the heat of polymerization from the polymerization system, thereby improving productivity.

2. Prior Art

Several methods for the polymerization of HFPO are known in the art. For example, U.S. Pat. No. 3,660,315 and JP-B 5360/1978 disclose a method for polymerizing HFPO using a tetraethylene glycol dimethyl ether (to be abbreviated as tetraglyme, hereinafter) solution of a compound of the following formula (1a) as a polymerization initiator, thereby producing a difunctional polymer of the following formula (2a).

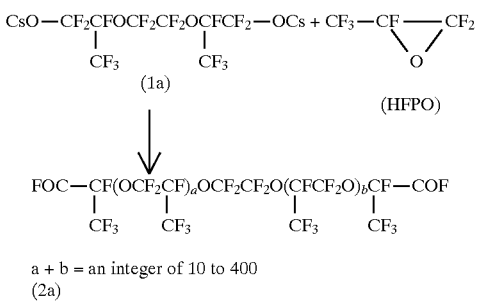

$a + b$ = an integer of 10 to 400
(2a)

This method is characterized in that polymerization of HFPO is carried out using a uniform solution obtained by mixing cesium fluoride, tetraglyme and FOCCF(CF$_3$)OCF$_2$CF$_2$OCF(CF$_3$)COF and separating the excess of cesium fluoride. This prevents the homo-polymerization of HFPO which is otherwise catalyzed by the excess of cesium fluoride, eventually suppressing the formation of a monofunctional HFPO polymer, that is, HFPO polymer which is functional at one terminal end.

J. Macromol. Sci.-Chem., 48 (3), 499–520 (1974), describes that the co-presence of hexafluoropropene (to be abbreviated as HFP, hereinafter) during polymerization of HFPO is effective for preventing chain transfer reaction and increasing the degree of polymerization of a polymer produced. Allegedly, the effect of HFP is to prevent chain transfer by trapping free fluoride anions.

As mentioned above, it is important to carry out polymerization of HFPO under such conditions as to suppress chain transfer reaction, that is, initiation of polymerization from a chemical species other than the initiator. To this end, the polymerization temperature should be kept as low as possible.

Well known with regard to the polymerization of HFPO is the tendency that as the polymerization temperature lowers, the selectivity of reaction increases, chain transfer is suppressed, the degree of polymerization of a polymer produced increases, and a less amount of a monofunctional polymer (by-product) forms when a difunctional initiator is used.

However, the attempt to lower the temperature encounters the problem that the polymerization system wherein the product is a polymer is essentially viscous and further thickens at a lower temperature. The practically acceptable temperature range is thus limited. If the reactor is of small size for laboratory use, the high viscosity content can be cooled. Since a large size reactor for commercial production, however, has a relatively smaller eat transfer area, a cooling efficiency comparable to that in the small size reactor cannot be accomplished unless the heat transfer area is increased by a special measure. Differently stated, in a conventional cylindrical reactor whose wall is cooled, the amount of HFPO which can be polymerized per unit time is governed by the effective heat transfer area rather than the internal volume of the reactor. Additionally, the coefficient of heat transfer of the reactor wall is drastically reduced as the viscosity of the content increases. Then, a rise of the internal temperature cannot be avoided unless the feed rate of HFPO is reduced to suppress the quantity of heat release or heat of polymerization. On scale-up manufacture, this causes serious barriers including an extended HFPO feed time and a drop of quality of the product due to the increased polymerization temperature.

In general, the heat transfer area can be increased by providing a coil within the reactor or circulating the content through a heat exchanger. These means can be applied with difficulty in the case of HFPO polymerization because the content is highly viscous.

Therefore, there is a need for a cooling method which is fully efficient for removing the heat of HFPO polymerization in a reactor of simple structure.

SUMMARY OF THE INVENTION

An object of the present invention is to provide a method for polymerizing HFPO by using a cooling means capable of efficiently removing the heat of polymerization from a high viscosity HFPO polymerization system in order to keep the polymerization temperature low. Another object of the present invention is to provide such a HFPO polymerization method which can be readily practiced on a large commercial scale.

Regarding a process of polymerizing HFPO into a fluorinated polyether, we have found that by adding a liquefied gas of fluorocarbon having 1 to 4 carbon atoms to a reaction system and polymerizing HFPO in the reactor while allowing the liquefied gas to evaporate from the polymerization system, the heat of polymerization can be efficiently removed as the latent heat of vaporization of the liquefied gas.

Accordingly, the invention provides a method for polymerizing HFPO into a fluorinated polyether, comprising the steps of adding a liquefied gas of fluorocarbon having 1 to 4 carbon atoms to a reactor, maintaining a gas phase in the reactor under a pressure lower than the vapor pressure of the liquefied gas, and polymerizing HFPO in the reactor while allowing the liquefied gas to evaporate from the polymerization system.

The method may further include the steps of cooling the vapor resulting from evaporation of the liquefied gas into a liquid and flowing the liquid back into the reactor and maintaining the liquid phase in the reactor at a temperature in the range of −70° C. to −10° C. These steps are accomplished by attaching a reflux means to the reactor. Alternatively, the method may further include the steps of compressing the vapor resulting from evaporation of the liquefied gas into a liquid and flowing the liquid back into the reactor and maintaining the interior of the reactor at a temperature in the range of −70° C. to −10° C.

DESCRIPTION OF THE PREFERRED EMBODIMENTS

Briefly stated, according to the invention, HFPO is polymerized by feeding a liquefied gas of fluorocarbon having 1 to 4 carbon atoms to a reaction system, that is, to a polymerization initiator for HFPO in advance or concurrent with HFPO, and removing the heat resulting from polymerization of HFPO (including heat of polymerization and mechanically generated heat) from the polymerization system through evaporation of the liquefied gas.

The polymerization initiator is not critical insofar as it can initiate the polymerization of HFPO. Commonly used polymerization initiators are mixtures of an alkali metal fluoride and an aprotic polar solvent and solutions prepared by adding carbonyl-bearing compounds such as ketones, acid anhydrides and acid halides to mixtures of an alkali metal fluoride and an aprotic polar solvent. Polymerization initiators may be prepared by well-known methods as described in U.S. Pat. No. 3,660,315. Cesium fluoride is a typical alkali metal fluoride. Glymes such as monoglyme, diglyme, triglyme and tetraglyme, diethyl ether and dioxane may be used as the aprotic polar solvent.

Preferably, the polymerization initiator is of the following general formula (1):

$$CsOCF_2—Rf—CF_2OCs \quad (1)$$

wherein Rf is a perfluoroalkylene group having 1 to 4 carbon atoms or an ether bond-containing perfluoroalkylene group having 2 to 10 carbon atoms. A polymerization initiator solution consisting of this polymerization initiator and an aprotic polar solvent as mentioned above is advantageously used.

Illustrative examples of the group represented by Rf are given below.

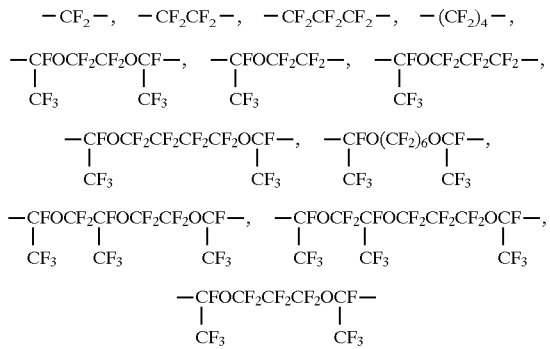

The polymerization initiator solution preferably contains the polymerization initiator in a concentration of about 10 to 60% by weight, more preferably about 25 to 45% by weight.

According to the invention, the reactor is charged with the polymerization initiator solution before HFPO is fed to the reactor where polymerization of HFPO takes place. In one preferred reactor embodiment, a pump is connected to a portion of the reactor surrounding the gas phase for adjusting the internal pressure of the reactor, and a condenser is connected to the suction or discharge side of the pump so that the liquid condensed in the condenser may flow back to the reactor.

After the reactor is charged with the polymerization initiator solution, the reactor is cooled to the polymerization temperature. Cooling may be done either by passing a coolant through a jacket around the reactor or by introducing a liquefied gas into the reactor and refluxing it by way of the condenser. The polymerization temperature which is the temperature of the liquid phase in the reactor is generally −70° C. to −10° C., preferably −50° C. to −25° C., more preferably −45° C. to −30° C.

Polymerization of HFPO can be carried out by sequentially feeding HFPO into the above-mentioned reactor. It is recommended that a liquefied gas of fluorocarbon having 1 to 4 carbon atoms is concurrently fed into the reactor, and the internal pressure of the reactor is adjusted by means of the pump so as to keep the polymerization temperature within the above-mentioned range. The liquefied gas used herein is of a fluorocarbon having 1 to 4 carbon atoms, which is preferably compatible with a polymer of HFPO and also preferably has a boiling point of lower than −15° C. under atmospheric pressure, especially equal to or lower than the boiling point of HFPO. Exemplary fluorocarbons include tetrafluoroethane, hexafluoroethane, octafluoropropane, perfluorobutane, trifluoromethane, pentafluoroethane, heptafluoropropane, difluoromethane, hexafluoropropene, tetrafluoroethylene, and chlorotrifluoroethylene, with the hexafluoropropene (HFP) being especially preferred.

The overall amount of the liquefied gas blended is preferably about 20 to 150 parts, especially about 40 to 70 parts by weight per 100 parts by weight of HFPO. Less than 20 parts of the liquefied gas would be insufficient to reflux, failing to achieve efficient cooling. With more than 150 parts of the liquefied gas, the yield of HFPO polymer per unit volume would become low.

The amount of HFPO fed may be appropriately selected, often in the range of about 10 to 400 mol, typically about 20 to 200 mol per mol of the polymerization initiator. HFPO may be fed in either gas or liquid form, but preferably under such conditions that the internal temperature may be kept constant. The feed time is about 3 to 120 hours.

The internal pressure is generally 9.8 to 196 kPa (absolute pressure) although it varies with the type and weight ratio of the liquefied gas added. Where HFP is used, it is preferred that about 20 to 150 parts by weight of HFP is added per 100 parts by weight of HFPO and the internal pressure is kept at about 12.7 to 90 kPa (absolute pressure).

At the end of HFPO feed, the reactor may be heated whereupon the liquefied gas is recovered. The contents are taken out, and a HFPO polymer is collected therefrom. Heating should be avoided in the case of HFP. It is recommended to recover HFP below −30° C. under vacuum because HFP reacts at elevated temperatures to form an oligomer.

According to the invention, the HFPO polymer produced varies in accordance with the type of polymerization initiator. For example, when a polymerization initiator of formula (1) is used, a fluorinated polyether is obtained as shown by the following reaction scheme.

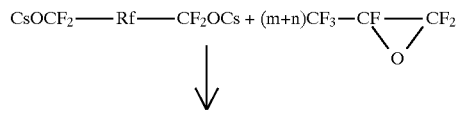

-continued

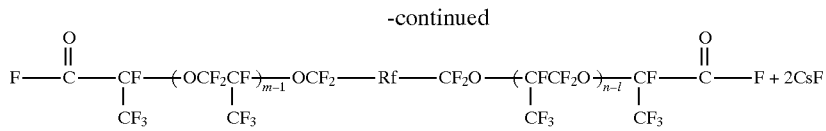

EXAMPLE

Examples of the present invention are given below by way of illustration and not by way of limitation.

Example 1

A glass reactor having an internal volume of 500 ml was equipped with an agitator, temperature sensor, and condenser. The condenser at the top was connected to a diaphragm type vacuum pump through a pressure sensor. An automatic valve having a mechanism which automatically opens and closes at a preset pressure was disposed between the pressure sensor and the vacuum pump for adjusting the pressure in the reactor to any desired level.

The reactor was charged with 13 g of a tetraglyme solution containing $5.0 \times 10^{-4}$ mol of a polymerization initiator of the following composition:

While the agitator was rotated at 120 rpm, the reactor was cooled with a coolant bath adjusted at $-35°$ C. After about 2 hours from the start of cooling, the temperature of the liquid phase within the reactor stabilized at $-32°$ C. The condenser was then cooled at $-80°$ C. whereupon 3.9 g of gaseous HFP was fed at a rate of 3.9 g/hr. into the reactor which was maintained under atmospheric pressure. The reflux behavior that the liquid condensed in the condenser flowed back to the reactor was observed during the feed of HFP, but the reflux stopped at the end of feed.

Next, the pressure within the reactor was adjusted to 58 kPa (absolute pressure) whereupon 108 g of HFPO and 54 g of HFP were continuously fed at a rate of 7.2 g/hr. and 3.6 g/hr., respectively, over about 15 hours. The reflux behavior that the liquid condensed in the condenser flowed back to the reactor was observed during the feed. The liquid phase in the reactor was at a temperature of $-35°$ C. to $-38°$ C. during the feed of HFPO.

After the feed of HFPO was over, the reaction solution was agitated for a further 2 hours. The cooling of the condenser was interrupted, the reactor was evacuated to about 5 kPa (absolute pressure), and the coolant bath was allowed to gradually warm up to near room temperature whereby the HFP was evaporated off. The content in the reactor was a white turbid oily liquid recovered in an amount of 118 g.

To 50 g of the recovered liquid were added 50 g of methanol and 40 g of 1,3-bistrifluoromethylbenzene. The mixture was agitated at 20 to 25° C. for 30 minutes. Methanol, 50 g, was added to the solution, which was allowed to stand to induce phase separation. The lower layer was collected and the volatiles were removed therefrom at 120° C. and 3 mmHg, yielding 44 g of a colorless, clear, oily liquid represented by the following formulae (A) and (B). The results of $^{19}$F-NMR analysis of this liquid are shown below.

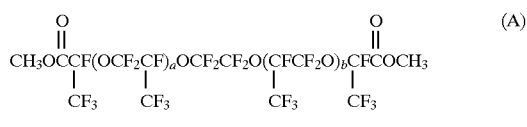

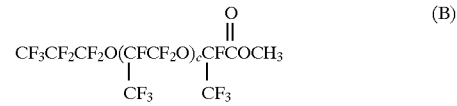

$^{19}$F-NMR
δ (ppm) CF$_3$COOH standard, integral ratio

| | | |
|---|---|---|
| −54 | k = 1.00 | C$\underline{F}$—$\overset{\overset{\displaystyle O}{\|}}{C}$— |
| −67 | m = 47.5 | OC$\underline{F}$—CF$_2$ |
| −2∼−5 | n = 230 | C$\underline{F}_3$, O—C$\underline{F}_2$— |
| −52 | x = 0.06 | CF$_3$C$\underline{F}_2$CF$_2$O— |

$(A)/(B)$ molar ratio = $94/6 = \dfrac{100(k-0.5x)}{k+0.5x} \Big/ \dfrac{100x}{k+0.5x}$ Average degree of polymerization = $92 = \dfrac{2m}{k+0.5x}$ It is evident from the above data that the mix molar ratio of (A)/(B) was 94/6 and the average degree of polymerization was 92.

Comparative Example 1

The same reactor as used in Example 1 was charged with 13 g of the same initiator as in Example 1. While the agitator was rotated at 120 rpm, the reactor was cooled with a coolant bath adjusted at $-40°$ C. After about 2 hours from the start of cooling, the temperature of the liquid phase within the reactor stabilized at $-37°$ C. The condenser was then cooled at $-80°$ C. whereupon 3.9 g of gaseous HFP was fed at a rate of 3.9 g/hr. into the reactor which was maintained under atmospheric pressure. The reflux behavior that the liquid condensed in the condenser flowed back to the reactor was observed during the feed of HFP, but the reflux stopped at the end of feed.

Next, with the reactor kept under atmospheric pressure, 108 g of HFPO and 54 g of HFP were continuously fed at a rate of 7.2 g/hr. and 3.6 g/hr., respectively, over about 15 hours. The liquid phase in the reactor was at a temperature of $-35°$ C. to $-37°$ C. during the feed of HFPO.

After the feed of HFPO was over, the reaction solution was agitated for a further 2 hours. The cooling of the condenser was interrupted, the reactor was evacuated to about 5 kPa (absolute pressure), and the coolant bath was allowed to gradually warm up to near room temperature whereby the HFP was evaporated off. The content in the reactor was a white turbid oily liquid recovered in an amount of 116 g.

The recovered liquid, 50 g, was treated as in Example 1, yielding 42 g of a colorless, clear, oily liquid. The results of $^{19}$F-NMR analysis of this liquid are shown below.

$^{19}$F—NMR

δ (ppm) CF$_3$COOH standard, integral ratio

-54    k = 1.00   C$\underline{F}$—$\overset{\overset{\displaystyle O}{\|}}{C}$—

-67    m = 47.0   OC$\underline{F}$—CF$_2$

-2~-5  n = 235    C$\underline{F_3}$, OC$\underline{F_2}$—

-52    x = 0.08   CF$_3$C$\underline{F_2}$CF$_2$O—

It is evident from the above data that the mix molar ratio of (A)/(B) was 92/8 and the average degree of polymerization was 90.

Example 2

The same reactor as used in Example 1 was charged with 13 g of the same initiator as in Example 1. While the agitator was rotated at 120 rpm, the reactor was cooled with a coolant bath adjusted at −35° C. After about 2 hours from the start of cooling, the temperature of the liquid phase within the reactor stabilized at −32° C. The condenser was then cooled at −80° C. whereupon 3.9 g of gaseous HFP was fed at a rate of 3.9 g/hr. into the reactor which was maintained under atmospheric pressure.

Next, the pressure within the reactor was adjusted to 58 kPa (absolute pressure) whereupon 108 g of HFPO and 54 g of HFP were simultaneously and continuously fed at a rate of 21.6 g/hr. and 10.8 g/hr., respectively, over about 5 hours. The liquid phase in the reactor was at a temperature of −35° C. to −38° C. during the feed of HFPO. After the feed of HFPO was over, the same operation as in Example 1 was carried out whereby HFP was evaporated off and the contents in the reactor were recovered. The amount was 120 g. The recovered liquid was reacted with methanol as in Example 1, yielding an oily liquid.

Similar analysis of this liquid showed that the mix molar ratio of (A)/(B) was 93/7 and the average degree of polymerization was 91.

Comparative Example 2

The same procedure as in Comparative Example 1 was carried out except that HFPO and HFP were fed at a rate of 21.6 g/hr. and 10.8 g/hr., respectively, over 5 hours. The temperature of the liquid phase within the reactor was −37° C. at the start of feed, gradually increased, and reached 12° C. at the end of feed. No HFP could be recovered from this reaction mixture. The reaction mixture was reacted with methanol as in Example 1, yielding an oily liquid.

Similar analysis of this liquid showed that the mix molar ratio of (A)/(B) was 53/47 and the average degree of polymerization was 52.

The outline of the polymerization process of the foregoing Examples and Comparative Examples is shown in Table 1.

TABLE 1

|  | E1 | CE1 | E2 | CE2 |
|---|---|---|---|---|
| Coolant bath temperature | −35° C. | −40° C. | −35° C. | −40° C. |
| Temperature of liquid phase in reactor | −35° C. to −38° C. | −35° C. to −37° C. | −35° C. to −38° C. | 12° C. to −37° C. |
| Pressure of gas phase in reactor | 58 kPa | 1 atm. | 53 kPa | 1 atm. |
| Reflux during HFPO feed | found | no | found | no |
| HFPO feed time | 15 hr. | 15 hr. | 5 hr. | 5 hr. |

Note that HFP has a boiling point of −29.6° C. at 101 kPa (1 atm.), a vapor pressure of 80 kPa at −35° C., and a vapor pressure of 62 kPa at −40° C.

When the gas phase pressure within the reactor is below the vapor pressure of HFP at the liquid phase temperature within the reactor as in Example 1, HFP refluxes whereby the liquid phase temperature within the reactor lowers below the temperature of the coolant bath. This suggests that the heat of HFPO polymerization is completely removed in the condenser. In contrast, the liquid phase temperature within the reactor is higher than the temperature of the coolant bath in Comparative Example 1. This suggests that heat removal takes place at the wall of the reactor. A comparison of Example 2 with Comparative Example 2 reveals that when the feed rate of HFPO is increased, the liquid phase temperature within the reactor is appropriately adjusted in Example 2 whereas the liquid phase temperature within the reactor rises far beyond the appropriate range in Comparative Example 2.

In the high viscosity HFPO polymerization system according to the invention, heat of polymerization is efficiently removed whereby the polymerization temperature can be kept low. Such heat removal is typically done through a condenser. Since it is easy from the design aspect to increase the heat transfer area of the condenser, HFPO can be briefly polymerized in a scale-up system.

Although some preferred embodiments have been described, many modifications and variations may be made thereto in the light of the above teachings. It is therefore to be understood that within the scope of the appended claims, the invention may be practiced otherwise than as specifically described.

We claim:

1. A method for polymerizing hexafluoropropene oxide into a fluorinated polyether, comprising the steps of
   adding a liquefied gas of fluorocarbon having 1 to 4 carbon atoms to a reactor, and
   polymerizing hexafluoropropene oxide in the reactor while maintaining a gas phase in the reactor under a pressure lower than the vapor pressure of the liquefied gas and allowing the liquefied gas to evaporate from the polymerization system.

2. The method of claim 1 further comprising the steps of:
   cooling the vapor resulting from evaporation of the liquefied gas into a liquid and flowing the liquid back into the reactor and
   maintaining the liquid phase in the reactor at a temperature in the range of −70° C. to −10° C.

3. The method of claim 1 further comprising the steps of:
   compressing the vapor resulting from evaporation of the liquefied gas into a liquid and flowing the liquid back into the reactor and
   maintaining the interior of the reactor at a temperature in the range of −70° C. to −10° C.

4. The method of claim 1 wherein the liquefied gas has a boiling point of less than −15° C. under atmospheric pressure.

5. The method of claim 1 wherein the liquefied gas is of hexafluoropropene.

* * * * *